3,180,908
GRAFT COPOLYMER COMPOSITION AND METHOD OF MAKING SAME
Willem J. van Essen, Cuyahoga Falls, and George H. Wear, Mogadore, Ohio, assignors to The General Tire & Rubber Company, a corporation of Ohio
No Drawing. Filed Aug. 12, 1960, Ser. No. 49,138
9 Claims. (Cl. 260—881)

This invention relates to graft polymers and to a method for making the same. More particularly, the present invention relates to graft polymers of suspension polymerized vinyl halide resins having good processing properties as well as good physical properties, especially good tear resistance and elongation at high temperaures.

Industry has become increasingly interested in flexible vacuum formable vinyl halide resin sheeting for such end use applications as seat covers, end caps, arm rests, door panels, crash pads, boots for convertibles, unsupported sheeting for boat seats, and so forth. The economics of thermoforming techniques are considered more favorable than the "cut and sew" technique formerly used. A desirable feature of such material is that it should be capable of being uniformly elongated (when vacuum formed) of about 200%.

Plasticized suspension polymerized vinyl chloride sheeting has many excellent properties and end uses. However, it is limited in use in thermoforming since it exhibits unsatisfactory hot tear resistance and non-uniform elongation at more than 200% elongation at 320 to 340° F. and shows poor room temperature dimensional stability when the formed piece is conditioned at room temperature after thermo-forming. While the addition of a nitrile rubber as a polymeric plasticizer to the polyvinyl chloride improves its thermo-forming properties by giving it a higher modulus and better hot tear resistance at thermoforming temperatures, the nitrile rubber plasticized polyvinyl chloride compounded sheet exhibits unsatisfactory dimensional stability after thermo-forming. Moreover, the nitrile rubber imparted poor ultra-violet stability as evidenced by discoloration and crazing. On the other hand, the addition of a known low viscosity 72-28 styrene/acrylonitrile copolymer resin to the plasticized polyvinyl chloride provided a flexible sheet which had good dimensional stability, but a satisfactory dispersion could not be easily obtained either by banburying or milling. The resultant sheet exhibited poor hot tear and heat elongation at elevated temperatures, i.e., at processing and thermoforming temperatures of 300–380° F., hereafter known as hot tear and elongation, and thus does not lend itself to vacuum forming.

It would be highly desirable to provide a method for producing or modifying a suspension polymerized vinyl halide polymer or resin so that it can be used in thermoforming or vacuum forming to make flexible sheets which have satisfactory hot tear strength, elongation and dimensional stability and which are easy to process.

Accordingly, it is a primary object of the present invention to provide a method of modifying a suspension polymerized vinyl halide resin so that it can be used to make a flexible compounded sheet exhibiting improved thermo-forming or vacuum forming properties.

Another object of this invention is to provide a modified suspension polymerized vinyl halide material exhibiting when plasticized and compounded improved hot tear strength and elongation, good processing and dimensional stability.

A further object is to provide a compounded plasticized modified suspension polymerized vinyl halide polymer exhibiting improved hot tear strength and elongation, good processing and dimensional stability.

These and other objects and advantages of the present invention will become more apparent to those skilled in the art from the following detailed description and examples.

According to the present invention, it has been discovered that a very useful polymeric material can be obtained by graft polymerizing in aqueous suspension a mixture of a vinyl nitrile monomer and a vinyl aryl monomer onto a previously suspension polymerized vinyl halide material, very preferably, in the presence of a minor amount of an essentially water insoluble organic swelling agent for the polymeric material. The resulting graft polymers are easy to process and homogeneous whereas blends of polyvinyl halides and copolymer resins of the vinyl nitrile and vinyl aryl monomers showed poor dispersion and are difficult to mill mix or blend. Flexible sheets of the new graft polymer exhibited swell and nerve (snappy elastic properties) on the mill while processing at 340° F., whereas the physical blend was a cheesy or dead stock. The graft polymer exhibited good hot tear and elongation whereas the physical blends did not. The graft polymer, also, exhibited better vacuum formability and more uniform draw and did not thin out and tear as sheets containing the physical blends. The graft polymer could be elongated uniformly from 400 to 2000% at 340° F. without tearing and exhibited satisfactory dimensional stability and could be processed at higher temperatures.

For example, when polyvinyl chloride is mixed in a mill with plasticizers, stabilizers, antidegradants, pigments, fillers and the like, gelled, fused, cooled to room temperature and then reheated to 340° F. and elongated at 340° F. (1 foot per second or greater; .020–.035 gauge sheet), it exhibited an elongation of only 200% before breaking. A similar composition prepared and treated in the same way but containing also mixed therewith 30 parts by weight of a 72/28 styrene-acrylonitrile copolymer on 100 parts of the polyvinyl chloride, exhibited an elongation at 340° F. of only about 260%. On the other hand, a polymer of the present invention wherein 100 parts of polyvinyl chloride have been subjected to graft polymerization with 30 parts of a mixture of 72 parts styrene and 28 parts acrylonitrile, and similarly compounded and treated, exhibited an elongation of about 2000%. Another important property of the graft polymer of the present invention is that higher processing temperatures may be used, thereby giving a greater temperature differential between thermo-forming and processing temperatures. For example, with plasticized polyvinyl chloride, milling can only be conducted at a maximum of 320–340° F. and processing at a maximum of 350° F., whereas with the styrene-acrylonitrile-polyvinyl chloride graft of the present invention, milling can be conducted at 340° F. and up to 360–380° F. and processing up to 380° F. without degradation.

Moreover, by the use of a swelling agent, it is possible to obtain essentially 100% conversions of the suspension polymerized graft polymer whereas without the swelling agent conversions of only up to 80%, for example at 50° C., are possible even though the vinyl aryl compound is a swelling agent to some extent for the vinyl halide polymer. Although with the use of higher temperatures up to 80° C., it is possible to get higher conversions, conversions to essentially 100% are not even then obtainable without the use of the swelling agent. Moreover, under these conditions the polymer gets yellow and is inferior to the graft polymer made at lower temperatures with the swelling agent. Thus, higher or complete conversions can be made at lower temperatures. Also, the use of the swelling agent overcomes the residual odor of the vinyl aryl monomer still adsorbed in the particles of resin. The resulting graft polymers are generally light colored to white free flowing powders; they contain at least 10% and usually more than 20% of the vinyl nitrile and vinyl aryl monomers grafted onto the vinyl halide polymer backbone; and they also contain polymeric configurations of unusually high molecular weight. The remaining vinyl nitrile and vinyl aryl monomers may be individually homopolymerized, copolymerized or mixed with ungrafted vinyl halide polymer. This graft aqueous suspension polymerization process is a very novel way in which to obtain satisfactorily and economically graft polymers having unusual properties. Mass graft polymerization cannot be performed satisfactorily due to the rapid and great amount of heat given off during the reaction which cannot be adequately dissipated, and solvent graft polymerization requires entirely too much solvent for economical purposes and requires too much subsequent handling. Moreover, the present suspension process provides better grafting efficiency than in latex grafting techniques. In the present process every polyvinyl halide particle acts as a small reactor or reaction vessel, giving an intimate molecular distribution of the components. Also, the present graft process is easier to handle than a latex process. Grafting in latex always gives rise to a certain amount of preflocks and in some cases coagulation unavoidably occurs. Also, at the end of the latex graft polymerization, the latex has to be coagulated, filtered and dried or spray dried to get the dry resin which often is in the form of hard cakes which have to be ground. On the other hand, the products obtained from the suspension graft polymerization of the present invention can be filtered off and dried to give directly free flowing powders. In fact, when attempts were actually made to graft 20% of styrene-acrylonitrile (72:28) onto polyvinyl chloride in a latex system, the resulting polymeric material exhibited poor heat stability and poor dispersion and nerve on the mill. It was similar to a blend of PVC and STY–VCN except for heat stability. Thus, apparently a latex system does not give the same molecular configuration as the present process.

The basic or backbone polymeric material is a suspension polymer or copolymer of a vinyl halide such as vinyl chloride, vinyl bromide and vinyl fluoride or copolymers of mixtures of these monomers; or copolymers of from at least 50% to about 99% by weight of a vinyl halide and from 50 to 1% by weight of a copolymerizable monomer having one carbon-to-carbon aliphatic double bond such as vinylidene chloride, vinylidene fluoride, vinylidene bromide, vinyl acetate and so forth and mixtures thereof.

The suspension polymer is normally prepared by suspension polymerizing vinyl chloride as a batch operation in autoclaves or pressure reaction vessels with exclusion of air or in an inert atmosphere ($N_2$, He, A, $CO_2$, Ne, etc.). The monomer mixture including water, catalyst and protective colloid (or suspending agent) is charged to the reactor and polymerization proceeds at about 120–150° F. for a number of hours until a pressure drop is observed which represents about 70% conversion. Polymerization can continue up to a theoretical 100%, although the percent rate of conversion per hour decreases rapidly after 70% conversion so that it is sometimes not practical to carry the polymerization beyond about 90% conversion. However, up to 70% conversion the rate of polymerization increases continuously with extent of conversion reaching a maximum at about 70% conversion.

In suspension polymerization, the polymerizable monomers are charged to the reactor and polymerized in the presence of a large volume of water which preferably is deionized. In general, there is used about 1 part by weight of the monomer or monomer mixture to 2 to 3 parts of water, although these amounts can be varied somewhat. A colloid is added to the reaction medium at the time the monomer is added or whenever convenient before polymerization. Catalysts are used in the reaction and can be any catalyst which will effect polymerization such as lauroyl peroxide, hydrogen peroxide, potassium persulfate, methyl ethyl ketone peroxide (60%), di-t-butyl peroxide, t-butyl peroxide, cumene hydroperoxide, Porofor N, diisopropyl benzene hydroperoxide, caproyl, p-methane hydroperoxide, peroxide, 2,4-dichlorobenzoyl peroxide, acetyl peroxide, and the like and mixtures thereof. Minor amounts of buffers and chain modifiers can be added if desired. Examples of such agents are sodium bicarbonate, lead stearate, calcium stearate, carbon tetrachloride, ethylene dichloride, ethylene trichloride and the like. Heat is applied as necessary to start or maintain the reaction. It can be obtained by heating the water first and pumping it to the reactor so that the polymerization mixture initially has a temperature of about 120 to 140° F. It is preferred to stir or agitate the mixture during polymerization to obtain the best particle size. If desired, polymerization can be short-stopped prior to completion by adding a short-stopping agent such as diisopropyl benzene monohydroperoxide, tertiary butyl hydroperoxide and so forth. The short-stop should be destroyed or removed before the subsequent graft polymerization.

Protective colloids having little surface activity are generally used in suspension polymerization to provide finely divided particles suspended in the aqueous medium. Examples of useful protective colloids are copolymers of from 30 to 50% vinyl acetate, balance 1-vinyl-2-pyrrolidone. Other polymers can be used as a colloid such as those obtained by copolymerizing a pyrrolidone, such as 1-vinyl-3-pyrrolidone, or vinyl piperidone, with a copolymerizable monomer such as vinyl acetate, acrylic acid, methacrylic acid, butyl acrylate, ethyl acrylate, methyl acrylate, ethyl vinyl ketone, allyl acetone, methyl (5-hexene-2-one) vinyl ether, vinyl isobutyl ether, allyl alcohol, 3-buten-1-ol, and the like and mixtures thereof. Still other protective colloids may be used such as gelatin, polyacrylamide, hydroxy ethyl cellulose, carboxy methyl cellulose, methyl cellulose, gum arabic, gum tragacanth, low molecular weight polyvinyl alcohols etc. These protective colloids are used in amounts of from about 0.01 to 4.0% by weight, and preferably from about 0.1 to 2% by weight, based on the weight of the polymer obtained. The catalyst can be used in an amount of from about 0.05 to 2.0% by weight based on the weight of the polymer obtained.

In carrying out the suspension polymerization of the backbone polymer, the monomer, such as vinyl chloride, in an amount of about 5 to 50% by weight, the balance being water, preferably in proportion of about 25–50% monomer and 75–50% water, plus minor amounts of catalyst and colloid are introduced into a reactor. The water may be heated to initiate the reaction or the reactor may be heated. Since the reaction is generally exothermic, the reactor can subsequently be cooled during polymerization. As polymerization starts the pressure remains constant until a conversion of about 70% is obtained at which time the pressure drops. It is preferred that the conversion be carried to from about 90 up to 100% (to obtain highest yields). The temperature of the reactor may vary over a wide range although in general the temperature will be from about 120 to 150° F. and preferably is about 130° F. The overall pressure in the reactor will depend upon the temperature until the pressure drops indicating that about 70% of the monomer has been converted to polymer and usually will be in the range of from about 90 to 160 p.s.i.g. During polymerization the pressure remains constant up to about 70% conversion, and then it drops continuously until the reaction essentially stops or is stopped. Other methods of suspension polymerization for making the backbone polymer can be used.

The graft polymerization can be conducted in the same reaction vessel in which the backbone polymer was suspension polymerized or the backbone polymer can be removed from the reactor (at any stage of conversion), filtered, dried, pulverized if necessary, although it is usually in the form of a free flowing powder, and reslurried in water in the same or another reactor and to which is added catalyst, if necessary, suspending agent and the grafting monomers. Any residual backbone monomers should be removed from the backbone polymer or reduced to below 10% by weight on the weight of the backbone polymer before the backbone polymer is subjected to graft polymerization. For example, the backbone polymer can be polymerized to 40, 60, 70% and the backbone monomer removed entirely or to less than 10% and the grafting monomers added mixed together or simultaneously and polymerization continued. Alternatively, the backbone monomer can be polymerized to about 95% to 100% when the grafting monomers are added and polymerization continued, under an oxygen-free atmosphere or in an inert or non-reactive atmosphere. Preferably the backbone polymer is polymerized to about 90% to obtain the greatest yield. The use of backbone polymers having increased viscosity results in graft polymers having improved tensile and tear strength.

The grafting monomers comprise a mixture of a copolymerizable vinyl nitrile monomer and a copolymerizable vinyl aryl monomer and their derivatives. Examples of useful vinyl nitrile monomers are acrylonitrile, α-methyl acrylonitrile, α-ethyl acrylonitrile, α-butyl acrylonitrile, α-chloro acrylonitrile, α-bromo acrylonitrile, α-fluoroacrylonitrile and the like and mixtures of the same. Examples of useful vinyl aryl monomers are styrene, α-methyl styrene, α-ethyl styrene, α-butyl styrene, α-chlorostyrene, α-bromostyrene, α-fluoro styrene, vinyl toluene and the like and mixtures thereof. In the mixture of grafting monomers charged to the reactor the vinyl nitrile monomer, or mixture of vinyl nitrile monomers, is used in a total amount of from about 10 to 50 parts by weight, preferably from about 20 to 35 parts by weight, while the vinyl aryl monomer, or mixture of vinyl aryl monomers, is used in a total amount of from 90 to 50 parts by weight, preferably from 80 to 65 parts by weight. The charge ratio of the monomeric grafting mixture to the backbone polymer is from about 20 to 100, preferably from about 25 to 50, parts by weight of the monomeric mixture for 100 parts by weight of the backbone polymer. At least 20 parts by weight of the monomeric grafting mixture on 100 of the backbone polymer should be used to obtain satisfactory hot tear strength in the resulting graft polymer. Over 100 parts of the mixture renders the suspension too viscous to handle without the addition of more suspending agent and water which makes the polymerization process uneconomical. The resulting graft polymer will contain these ratios of grafting monomers at 100% conversion. At conversions of less than 100%, for example about 70%, lower amounts of graft polymer will be produced. However, the ratios of monomers and backbone polymer will be substantially similar. In any event, graft polymerization should be conducted to obtain a graft polymer having proportions of grafting monomers to the backbone polymer within the above ranges.

The swelling agent employed can be any organic swelling agent for the backbone polymer which will cause the backbone polymer to be swollen and which will permit entry of the grafting monomers into the backbone polymer particle and the polymerization in the particle on the backbone polymer chain. The swelling agent should be stable and insoluble or only slightly soluble in water and have a melting point below about 20° C. Since reactions are generally conducted in an autoclave, the boiling point is not too important since part of the swelling agent will be under pressure in the suspension. If a reactor at atmospheric pressure is used, then the boiling point should be above about 80° C. The swelling agent should preferably be relatively volatile or have a high vapor pressure so that it can readily be removed from the graft polymer.

Examples of useful swelling agents are the alkyl ketones such as methyl propyl ketone, 3-methyl-2-pentanone, methyl isobutyl ketone, diethyl ketone, diisopropyl ketone, ethyl isopropyl ketone, amyl ethyl ketone, 2-heptanone, ethyl butyl ketone, ethyl isoamyl ketone, dipropyl ketone, isobutyl propyl ketone, butyl methyl ketone, 5-methyl-2-hexanone, 3-hexanone, 5-methyl-3-hexanone, pinacolin, heptyl methyl ketone, ethyl hexyl ketone, dibutyl ketone, methyl propyl ketone, 3-methyl-2-pentanone, 4-methyl-2-pentanone, diisobutyl ketone, methyl nonyl ketone, ethyl octyl ketone, diamyl ketone, methyl octyl ketone, hexyl propyl ketone, hexyl methyl ketone, 3-methyl-2-butanone, and the like and mixtures thereof.

Other swelling agents which are useful in the practice of the present invention are the halogenated alkanes such as monochloromethane, monobromomethane, monofluoromethane, monoiodomethane, methylene chloride, methylene fluoride, methylene iodide, 1,1-dichloroethane, 1,2-dichloroethane, 1,1,1-trichloroethane, 1,1,2-trichloroethane, monochloroethane, 1-bromo-2-chloroethane, 1-chloro-1,1,2,2,2-pentafluoroethane, 1,1-dibromoethane, 1,1-dichloro-1,2,2,2-tetrafluoroethane, 1,2-dichloro-1,1,2,2-tetrafluoroethane, 1,1-difluoroethane, pentachloroethane, 1,1,2,2-tetrabromoethane, 1,1,2,2-tetrachloromethane, 1,2-dibromo ethane, ethylfluoride, ethyl iodide, tert-butyl methyl bromide, propylene bromide, 1,2-dichloropropane, 2,2-dichloropropane, 1,2,3-tribromopropane, 1,2,3-trichloropropane, propyl chloride, 2-chloro-2-methyl butane, butyl bromide, butyl chloride, tert-butyl chloride, amyl fluoride, amyl iodide, amyl chloride, 1,5-dibromopentane, 1-bromohexane, 1-chlorohexane, 1-bromoheptane, 1-iodoheptane, 1-chloroheptane, 1-bromooctane, 2-chlorooctane, and the like and mixtures thereof.

Still other swelling agents which can be employed are the aromatic hydrocarbons such as benzene, toluene, para-xylene, ortho-xylene, meta xylene, ethyl benzene, 1,2,3-trimethyl benzene, 1,2,4-tri-methyl benzene, mesitylene, n-propyl benzene, cumene, p-cymene, isodurene, durene, 1,2,3,4-tetramethyl benzene, o-diethyl benzene, p-diethyl benzene, m-diethyl benzene, amyl benzene, 4-ethyl-o-xylene, 5-ethyl-m-xylene, 2-ethyl-p-xylene, o-ethyl-toluene, p-ethyl-toluene, butyl benzene, secondary butyl benzene, tert-butyl benzene, p-butyl toluene, 3,5-diethyl toluene, 1-ethyl-3-isopropyl benzene, 1-ethyl-4-isopropyl benzene, isoamyl benzene, isobutyl benzene, isohexyl benzene, pentaethyl benzene, 1,2,4-triethyl benzene, 1,3,5-triethyl benzene, decahydronaphthalene, 1,4-dimethyl naphthalene, 2-ethyl-naphthalene, hexahydronaphthalene, 1-methyl naphthalene, 1,2,3,4-tetrahydronaphthalene, and the like and mixtures thereof.

Other swelling agents which can be used are the organic phosphates such as phenyl dimethyl phosphate, tributyl phosphate, tri-(2-ethyl hexyl) phosphate, tributoxy ethyl phosphate, cresyl diphenyl phosphate, diphenyl ethyl phosphate, ditolyl ethyl phosphate, tricresyl phosphate, tridimethyl phenyl phosphate, dibenzyl amyl phosphate, dibenzyl butyl phosphate, octyl diphenyl phosphate, benzyl dibutyl phosphate, phenyl dihexyl phosphate, diphenyl amyl phosphate, tolyl dihexyl phosphate, diphenyl isobutyl phosphate, di(ethyl benzylene) butyl phosphate, di-(butyl phenylene) butyl phosphate, diphenyl mono-o-xenyl phosphate, di(amyl phenylene) butyl phosphate, didurenyl butyl phosphate, trichloroethyl phosphate, and the like and mixtures thereof. Preferred phosphates have the general formula $O=P-(OR)_3$ where one R is an alkyl group and the remaining R's are aryl, alkaryl, aralkyl or alkaralkyl radicals.

Another useful group of swelling agents to employ are the phthalates such as dioctyl phthalate, butyl benzyl phthalate, ethyl benzyl phthalate, dibutyl phthalate, amyl benzyl phthalate, isobutyl tolyl phthalate, butyl decyl phthalate, hexyl tolyl phthalate, methyl tolyl phthalate, isopropyl tolyl phthalate, amyl tolyl phthalate, butyl isohexyl phthalate, isobutyl benzyl phthalate, butyl benzyl isophthalate, ethyl phenyl phthalate, butyl phenyl phthalate, diisooctyl phthalate, isobutyl phenyl phthalate, dicapryl phthalate, amyl (butyl-phenylene) phthalate, butyl (ethyl-benzylene) phthalate, propyl durenyl phthalate, di-2-ethyl hexyl phthalate, and the like and mixtures thereof. These compounds have the general formula

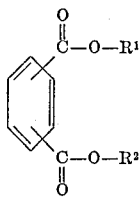

where $R^1$ and $R^2$ are from the group of alkyl, aryl, aralkyl, alkaryl, alkaralkyl radicals and mixtures thereof. Preferably, $R^1$ is alkyl and $R^2$ is aryl, alkaryl, aralkyl or alkaralkyl.

Even vinyl chloride, vinyl fluoride and/or vinyl bromide can be used as a swelling agent. Use of these vinyl monomers as the swelling agent reduces the amount of residual volatile content and eliminates extended drying to remove the residual swelling agent.

Mixtures of swelling agents can be employed.

When vinyl chloride is used as a swelling agent, it is preferably used in an amount of only from about 5 to less than 10 parts by weight based on 100 parts by weight of the backbone polymer to give white or colorless particles. Higher amounts of vinyl halide from 10 up to 30 parts give a yellow resin with somewhat reduced heat stability and lower physical properties but are still usable. At less than 10 parts by weight, very little if any of the vinyl chloride and the like interferes with the grafting or polymerization reaction. The other swelling agents are employed in an amount of from about 8 to 30 parts by weight based on 100 parts by weight of the backbone polymer. Preferably, there are used from about 10 to 18 parts by weight of the other swelling agents to 100 parts by weight of the backbone polymer. In all cases sufficient swelling agent should be used to get the desired reaction. The reaction stops when not enough swelling agent is employed at lower conversions.

Catalyst used for the grafting reaction can be any catalyst customarily employed for vinyl halide suspension polymerization such as those described above. If graft copolymerization is to be done in the same vessel in which the backbone polymer was polymerized, very little additional catalyst need be used. In general, this can amount to from 0 to about 0.3 part by weight based on 100 parts by weight of the grafting monomers. This depends on the amount of residual catalyst present. On the other hand, if the backbone polymer was removed from the reactor, filtered, washed and then reslurried in water, more catalyst may be needed, for example, from about 0.05 to 2.0% by weight based on the weight of the monomers. However, too much catalyst should be avoided during the graft polymerization since this results in a decrease in molecular weight and in the desired properties.

Reaction temperature for the graft polymerization should be from about 25 to 75° C. Temperatures of 80° C. or higher should be avoided as they result in a polymeric material having unsatisfactory color and heat stability. Preferred temperatures are from about 45 to 55° C. Conversion or reaction times will vary depending on amount of materials employed or the size of the batch.

Sufficient water should be added to provide a good suspension for the grafting monomers and backbone polymer. In general, the amount of water may vary from about 50 to 95% by weight and the total of grafting monomers and polymers from about 50 to 5% by weight. Where the graft is to be performed in the same reactor containing the polymerized aqueous suspension of the vinyl halide monomer, additional water may be added or the water already present may be adequate.

Chain modifiers like tertiary dodecyl mercaptan can be added to lower the inherent viscosity of the resulting graft polymer. However, large amounts are to be avoided since they tend to impair the hot tear strength and elongation. For example, about .07 part of tertiary dodecyl mercaptan on 100 parts by weight of the backbone polymer is about the maximum that can be tolerated with this particular modifier.

Additional suspending agent is not normally required especially where the grafting reaction is done in the same aqueous mixture in which the backbone polymer was polymerized. However, if the viscosity of the slurry is too high, additional suspending agent may be needed, usually in very small amounts. The suspending agents used are generally the same as those shown above. The reaction mass or aqueous suspension is desirably agitated or stirred during the grafting reaction. At the end of the reaction and after removal of the graft polymer, water and so forth, the reactor should be cleaned to remove residual vinyl aryl monomer which may interfere with subsequent vinyl halide polymerization by causing increased reaction times. Alternatively, two reactors can be used in which the backbone polymer suspension is pumped to a second reactor where graft polymerization can occur.

In one method of forming a graft polymer starting with dry, washed polyvinyl halide, sufficient water is introduced into the reactor and then the polyvinyl halide resin is introduced and slurried in the water. Next, the swelling agent is added and the mixture is agitated so that the swelling agent will swell the polymer. These steps can be varied somewhat. After several minutes to an hour or so when the polyvinyl halide resin is swollen by the swelling agent, the grafting monomers are added separately or mixed together and then the catalyst alone or in admixture with a part of the swelling agent is added and polymerization started. Heat can be applied if necessary, or the reactor can be cooled if too much heat is generated. Another method is to add the swelling agent to the original polyvinyl halide aqueous suspension containing all of the original ingredients or their residues (catalyst, suspending agent and so forth) along with any necessary water. After the induction or swelling period of the polyvinyl halide, the grafting monomers are added in which the catalyst is dissolved or the catalyst is dissolved with a part of the swelling agent and polymerization started. It is not necessary to strip residual vinyl halide monomer when present. During the reaction, polymerization takes place in the swollen polyvinyl halide particles. In this way an almost molecular distribution of the formed resin in the polyvinyl halide matrix can be obtained and no appreciable dispersion difficulties during subsequent milling of the graft polymer are obtained.

It is not precisely known what occurs during the grafting reaction, but it is believed that a free radical attack on the backbone of the prepolymer (backbone polymer) starts a grafting reaction, although a certain amount of grafting also can be expected by chain transfer of the growing chain to the backbone polymer. It is apparent that the grafting reaction should occur only when the monomers can diffuse into the backbone polymer particle. This diffusion depends on the compatibility of the components, temperature, molecular weight and so forth. In the case of a suspension of rigid particles (e.g. a PVC suspension) a distribution of added monomer over the different phases takes place. A homogenous distribution throughout the whole phase of each polymer particle can be expected only in the case of good compatibility (solubility) of monomers and polymers. In the present case the polyvinyl chloride particle is swollen with the particular swelling agent so that the monomers are distributed homogenously. On the other hand, where no swelling agent is used and if the polymer and monomers are incompatible, the monomers exist as separately removed monomer droplets in the aqueous medium and a certain amount of the monomers are only merely absorbed on the surface of the hard, non-swollen polyvinyl chloride particles. The picture is more complicated when monomer and catalyst are used with different solubility (and consequently, diffusion) characteristics. If only a part of the monomers will diffuse into the particle, the rest of the isolated monomer will polymerize to a normal homopolymer which is lost for any grafting reaction. However, in the present case it is apparent that substantial grafting occurs so that the situation is well between the extremes and lies more toward the situation in which the highest grafting efficiency can be obtained. Thus, to get maximum grafting efficiency, all of the monomers should be distributed homogeneously throughout the whole phase of the vinyl halide polymer particle, for example, PVC particle. Thus, the swelling agents of the present invention have been discovered to give a certain compatibility of polymer and monomers by increasing the solubility and diffusion rate of the monomers and catalysts. These swelling agents apparently have good swelling properties for the polymer, good solvent characteristics for the monomer and low water solubility. Also, these swelling agents increase the degree of conversion. 100% grafting efficiency probably does not occur since some organic materials interfere with free radical polymerization by chain transfer reactions to influence molecular weight and grafting efficiency. The highest efficiency to be expected is by forming free radicals on the backbone polymer by irradiation (U.V., gamma rays etc.). Also, there is a difference in the reactivity ratio of the free radical attack to the backbone polymer and to the monomers. The use of a swelling agent, and particularly those described herein, provides reaction conditions where grafting efficiency can be increased or maximized. In any event, the use of the swelling agent(s) of the present invention increases the compatibility of the components resulting in improved properties and apparently gives a branched or graft structure which improves many properties such as flow, etc., but also increases the compatibility of the polymeric components to make the graft polymer entirely different from physical mixtures.

For example, the polymerization of styrene and acrylonitrile (72:28 ratio) in a PVC suspension resulted in a conversion of only 60–80% when no swelling agent was used. With the use of swelling agents, monomer conversions were much higher and between 90–100%. A possible explanation for these higher conversions is the following: The diffusion rate, of e.g. styrene, is much higher than that of the catalyst lauroyl peroxide. This means that styrene is diffused into the particle to places where no free radicals can be formed and, consequently, no polymerization can be started. With swelling agents, the solubility of the different components is more equalized. Moreover, actual monomer concentration at 80% conversion is very low. At a PVC/monomer(s) ratio of 100/30, the free monomer concentration at 80% conversion is only 5%. At these low concentrations, the reaction rate of the polymerization process slows down because mobility in the rigid phase is falling off. Swelling agents increase, however, the mobility of the monomers and polymer chains, and high polymerization rates are unexpectedly realized especially for low monomer concentrations at the end of the conversion.

The graft polymer should be compounded with various conventional stabilizers for vinyl chloride type resins to protect the polymer against heat, light, weather and so forth. Examples of the same are the well known barium-cadmium compounds such as the barium-cadmium laurates and similar soaps, barium phenates plus cadmium soaps (octoate), aromatic barium-cadmium compounds and the like. The zinc stabilizers like zinc soaps of fatty acids, octoates, etc. can be used with the Ba–Cd stabilizers. Organic phosphites or chelators are, also, desirably added. Epoxidized oils and esters as well as ultraviolet absorbers including the benzophenones such as the 2-hydroxy substituted benzophenones can also be used. Organic tin compounds such as the dibutyl tin compounds containing acid, alcoholate, mercapto or their modified groups can be used. Examples of useful tin compounds are dibutyl tin dilaurate, dibutyl tin maleate, dibutyl tin mercaptide, dibutyl tin mercapto acetate ester as well as the corresponding dioctyl tin compounds.

The graft polymer should, also, be compounded with antidegradants such as age resistors or antioxidants and the like during banbury or mill mixing to prevent discoloration or degradation on or in the mill and during subsequent vacuum forming or drawing. Very useful antioxidants are the phenolic and amino antioxidants which are used in an amount sufficient to prevent polymer degradation, for example, from about 0.1 to 3.5 preferably from about 0.5 to 2.0, parts by weight based on 100 parts by weight of the graft polymer. Examples of useful phenolic antioxidants are hydroquinone monobenzyl ether (Agerite), the styrenated phenols (Agerite Spar), the polyalkyl polyphenols (Agerite Superlite), styrenated resorcinols, and the like and mixtures thereof. Examples of suitable amine antioxidants to employ are octylated diphenyl amine (Agerite Stalite and Agerite Stalite S), diphenylamine acetone reaction products (Agerite Superflex), phenyl-$\beta$-naphthylamine, diphenyl-p-phenylenediamine, p-isopropoxy diphenyl amine, aldol-$\alpha$-naphthylamine, polymerized trimethyl dihydroquinoline, sym.-dibeta-naphthyl-p-phenylenediamine, N′ - phenyl-N′-cyclohexyl para-phenylene diamine, N-p-methoxyphenyl-N′-cyclohexyl-p-phenylene diamine, toluidine, the N-acyl-ethylene imines, such as N-benzoyl ethylene imine, and the like and mixtures thereof. Mixtures of these antioxidants and stabilizers can be used.

The graft polymers obtained according to the method of the present invention can be plasticized with well known plasticizers such as dioctyl phthalate, tricresyl phosphate, dioctyl azelate, the non-migratory polyester plasticizers and others well known to the art. Fillers, stearic acid, polyvinyl chloride, polyacrylate, nitrile rubber, extenders, other rubbers and resins, pigments, diatomaceous earth, clay, titanium dioxide, calcium carbonate, phthalocyanine pigments, silica, carbon black, dyes, fungicides, fire resistant materials, curing agents, and other compounding ingredients can be mixed and blended with these graft polymers as is known to the art. These graft polymers are very useful in forming rigid, semi-rigid, and flexible vacuum formable and dimensionally stable vinyl sheeting for seat covers, arm rest covers and so forth. The resulting polymers can be dissolved in solvents and used for can coatings, can be used as coatings on fiber or cardboard boxes and so forth. They can be made into supported or unsupported films, sheets and the like for use in making upholstery materials for furniture, and for the interior of automobiles, shower curtains, decorative wrappings, wall coverings, pressure sensitive adhesive tapes, plastic-metal laminates, plastic-wood laminates, and so forth. They can also be used in the manufacture of floor tile, shoe uppers, phonograph records, toys and the like. They can be blown (film) and extruded as well as mixed with blowing agents to make sponge or cellular materials for insulation and the like.

The following examples will serve to illustrate the invention with more particularity to those skilled in the art:

EXAMPLE I

Styrene and acrylonitrile were graft polymerized onto polyvinyl chloride according to the following recipe and method.

| Material: | Parts by weight |
|---|---|
| Polyvinyl chloride (suspension polymerized, inherent viscosity about 1.02) | 100 |
| Deionized water | 250 |
| Methyl isobutyl ketone (swelling agent) | 12.5 |
| Styrene | 21.6 |
| Acrylonitrile | 8.4 |
| Lauroyl peroxide (catalyst) | 0.2 |

The reactor vessel was charged with all of the water. The dry polyvinyl chloride powder was added under proper agitation to give a homogeneous slurry in the water. A solution of the catalyst in the methyl isobutyl ketone was then added. The mixture was agitated for one hour at 50° C. to allow the polyvinyl chloride to become swollen. All of the styrene and acrylonitrile monomers, intimately premixed, were then added. The reactor was purged with nitrogen gas and evacuated twice, and then pressurized with 25 p.s.i. of nitrogen. The reaction was carried on for approximately 10–20 hours at 50° C. under constant agitation. At the end of this time, the monomers were 95–100% polymerized. The resin slurry was then filtered and dried to provide a fine white powder. The inherent viscosity of the resulting graft polymer was about 2.0.

EXAMPLE II

The method of this example was similar to that of Example I, above, except that the $H_2O$ was increased to 375 parts, the styrene was increased to 24 parts, the acrylonitrile was increased to 9.3 parts and the methyl isobutyl was reduced to 6,25 parts. After 16 hours at 50° C., the conversion was about 84% with the production of a fine white powder. When this run was repeated without the methyl isobutyl ketone, only 73–77% conversion was obtained after 20 hours.

EXAMPLE III

The method of this example was similar to that of Example I, above, except that butyl benzyl phthalate was substituted in one instance and octyl diphenyl phosphate was substituted in another instance for the methyl isobutyl ketone. The swelling period was conducted at about 80° C. Then polymerization was conducted at 50° C. The results were essentially the same except that the graft copolymers obtained exhibited slightly better physicals than the graft copolymer made with methyl isobutyl ketone. Moreover, when dioctyl phthalate or dioctyl azelate were used in place of these swelling agents under these same conditions, graft polymers having somewhat lower physical properties but which still could be used were obtained.

EXAMPLE IV

Styrene and acrylonitrile were graft polymerized onto polyvinyl chloride according to the following recipe and method.

| Material: | Parts by weight |
|---|---|
| Polyvinyl chloride (suspension polymerized, inherent viscosity about 1.02) | 800 |
| Deionized $H_2O$ | 3000 |
| Styrene | 172.8 |
| Acrylonitrile | 67.2 |
| Lauroyl peroxide | 1.6 |
| Swelling agent (as indicated below). | |

The polyvinyl chloride and water were added to a resin kettle and placed in a thermostated oil bath at 50° C. Nitrogen was bled through under stirring and the swelling agent was added. After a one hour swelling period, the styrene+acrylonitrile monomer mixture was added and also the catalyst dissolved in part of the swelling agent. After a 20 hour reaction period (overnight), the graft resin was filtered off and dried in a circulating air oven at 60° C. (about 30 hours). The conversion data are given below:

| Run No. | Swelling agent | Parts per 100 parts PVC | Percent conversion |
|---|---|---|---|
| 10 | Dichloroethane | 12.5 | [1] 96 |
| 11 | do | 18.8 | 93 |
| 12 | do | 25 | 95 |
| 13 | do | 12.5 | 92 |
| 14 | do | 12.5 | 94.5 |
| 20 | Dichloromethane [2] | 12.5 | 72 |
| 21 | do.[2] | 25 | 92 |
| 22 | do.[2] | 12.5 | 80 |
| 23 | do.[2] | 18.8 | 93 |
| 30 | Trichloroethane | 18.8 | [3] 100 |
| 31 | do | 25 | [3] 100 |
| 32 | do | 12.5 | 92 |
| 33 | do | 25 | [3] 100 |

[1] Conversions of 94.5–96% in capped bottles after 8–12 hours.
[2] Resin kettle under nitrogen at atmospheric pressure. In capped bottles (under $N_2$ pressure) a conversion of 92.5% was obtained in 8 hours. Dichloromethane boils at 40.1° C. and the experiment was run at 50° C.
[3] May contain same residual trichloroethane.

EXAMPLE V

The method of this example was similar to that of Example I, above, except that toluene was used in place of the methyl isobutyl ketone. After 16 hours at 50° C., the conversion was 98%. The resulting graft polymer was very similar to that of Example I.

EXAMPLE VI

Several of the graft polymers prepared similarly to the preceding examples were compounded (mill mixed at about 340° F.) with conventional polyvinyl chloride plasticizers (about 56 parts by weight), light stabilizers and antioxidants (2.5), stearic acid (.25), and $TiO_2$ and $CaCO_3$ (10) based on 100 parts by weight of the graft polymer and tested. The results of the tests on the compounded stocks are shown below:

*Swelling agents*

| Condition or test | Dichloroethane | Dichloromethane | Toluene | Methyl isobutyl ketone |
|---|---|---|---|---|
| Parts of swelling agent on 100 PVC. | 12.5 | 18.8 | 12.5 | 12.5. |
| Mill stability: | | | | |
| Percent swell,[1] 15 min | 47.75 | 52 | 52 | 52. |
| Percent swell,[1] 30 min | 47.75 | 54 | 52 | 52. |
| Percent swell,[1] 45 min | 47.75 | 45.5 | 52 | 47.75. |
| Hot elong,[2] 45 min | Fairly good | Good | Good | Good. |
| Hot tear,[3] 45 min | Good | do | do | Do. |
| Nerve, 45 min | Moderate | Excess | Moderate | Moderate. |

[1] Swell—When a sample of the plasticized and compounded graft polymer is cut close to the nip of the rolls of a 2-roll mill under the front roll, a sample of the stock will contract in one direction and expand in the other direction. The percent of expansion is the amount of swell. This is also a property exhibited by elastomeric polymers such as compounded natural rubber. On the other hand plasticized polyvinyl chloride alone exhibits no swell at all.
[2] At 340° F. on the mill. Stock pulled from mill will elongate from 200 to over 1,000% without breaking whereas plasticized PVC or blends of PVC and STY-VCN copolymer break almost immediately when attempts are made to pull them from the mill.
[3] Sample cut from mill at 340° F. elongates but cut does not grow on remaining band on the mill. PVC and PVC/STY-VCN physical blends on the other hand do not exhibit these properties.

These results show that the processing properties of the graft polymers prepared according to the present invention using various swelling agents are very similar.

EXAMPLE VII

The compounding method of this example was similar to that of Example VI, above, except that one polymer was a graft polymer similar to that prepared by the method of Example I, above, while the other polymeric material was a mill mixed blend of 100 parts by weight of a suspension polymerized polyvinyl chloride having a viscosity of about 1.03 and 30 parts of a suspension polymerized copolymer having a viscosity of 3.69 and of 72 parts by weight of styrene and 28 parts of acrylonitrile. Thus in both instances, the ratios of PVC to STY+VCN were chemically similar as was the ratio of STY+VCN (e.g. 100:30 and 72:28). The inherent viscosity of the graft polymer was about 2 and the inherent viscosity of the blend was about 1.6. The results on tests were as follows:

| Tests | Graft polymer similar to Example I, above | Physical blend of PVC +STY-VCN copolymer |
|---|---|---|
| Dynamic mill stability: | | |
| Percent swell in 15 minutes | 52 | 2.2. |
| Hot elongation | Good | Poor. |
| Hot tear | do | Do. |
| Percent swell in 30 minutes | 52 | 2.2. |
| Hot elongation | Good | Poor. |
| Hot tear | do | Do. |
| Percent swell in 45 minutes | 47.75 | 2.2. |
| Hot elongation | Fairly good | Poor. |
| Hot tear | Good | Do. |
| Room temperature properties: | | |
| Tensile, p.s.i., Tinius Olsen Universal Tester, 1 foot per min. | 2,425 | 1,075. |
| 100% modulus, p.s.i. | 1,150 | 950. |
| 200% modulus, p.s.i. | 1,650 | |
| 300% modulus, p.s.i. | 2,050 | |
| Ultimate elongation | 380 | 210. |
| Graves tear | 355 | 249. |
| Percent set (elongation to 100% plus 10 min.) | 18.7 | 18.7. |
| Permanent set (elongation to break) | 85 | 25. |
| Shore A hardness | 85 | 84. |
| Properties at 300° F.: | | |
| Tensile, p.s.i., Tinius Olsen Universal Tester, 1 foot per min. | 18.9 | 12.9. |
| 100% modulus, p.s.i. | 12.4 | 9.7. |
| 150% modulus, p.s.i. | 14.6 | 11.3. |
| 200% modulus, p.s.i. | 16.3 | 12.6. |
| Graves tear | 6.4 | 3.4. |
| Ultimate elong., percent | 470 | 260. |
| Vacuum forming properties: | | |
| Flower pot mold, 100% to 125% elong.: | | |
| Percent shrinkage after 16 hrs. at R. T. | 2.6 | 2.6. |
| Percent shrinkage after 4 hrs. at 250° F. | 15.6 | 18.6. |
| Inherent viscosity in tetrahydrofuran at 25° C. | 1.914 | 1.616. |

The above results clearly show the superiority of the graft polymer of the present invention as compared to physical blends.

EXAMPLE VIII

In order to detect an inherent difference between a graft polymer prepared essentially according to Example I, above, and physical blends of polyvinyl chloride and styrene-acrylonitrile copolymer, blends of 10%, 15%, 20% and 25% styrene-acrylonitrile copolymer (72 STY–28 VCN) in polyvinyl chloride were prepared by mixing weighed quantities of a suspension polymerized STY–VCN copolymer (I.V.=3.69) and a suspension polymerized polyvinyl chloride (I.V.=1.03). Inherent viscosities of the solutions of the resin mixtures in tetrahydrofuran at 25° C. were measured and compared with the viscosities of the graft polyvinyl chloride (9.5% to 23.5%) mixture of styrene (72%) and acrylonitrile (28%) on 100 polyvinyl chloride. The results were plotted, inherent viscosity on ordinate and percent styrene and acrylonitrile on abscissa. The plot of the physical mixtures was linear but the plot of the graft polymer was a curve. The slopes of the plots above 15% were obtained. Results are shown in the following table:

| Percent STY+VCN in graft or in polymer mixture on 100% by wt. of total polymeric material; ratio STY:VCN is about 72:28 | Graft polymer I.V. | Calculated inherent viscosity of STY and VCN as a copolymer in graft | Physical blends | |
|---|---|---|---|---|
| | | | I.V. (obs'd.) | I.V. (calc'd.) |
| 9.5 | 1.21 (A) | 2.93 | | |
| 10.0 | | | 1.25 | 1.30 |
| 13.4 | 1.42 | 3.95 | | |
| 15.0 | | | 1.41 | 1.43 |
| 15.5 | 1.47 (B) | 3.87 | | |
| 17.1 | 1.79 | | | |
| 19.4 | 1.78 | 4.90 | | |
| 20.0 | | | 1.58 | 1.56 |
| 20.5 | 2.03 (C) | | | |
| 22.3 | 2.02 | 5.47 | | |
| 22.6 | 2.29 | | | |
| 23.5 | 2.27 | 6.30 | | |
| 25.0 | | | 1.62 | 1.70 |
| 26.2 | 2.36 | | | |
| 30.0 | 2.72 | 6.65 | | |
| 100.0 | | | 3.69 (linear) | |
| Slope of plot: (above 15%) | (curve) 0.0735 | | (linear) 0.0278 | (linear) 0.0269 |

The greatest slope of the grant polymer plot reveals a significant difference in the inherent properties of this product.

I.V.—inherent viscosity, obs'd.—observed, and calc'd—calculated. (A) swell—19.5%, (B) swell—35.0%, and (C) swell—52.0%.

These results, inherent viscosities, clearly show that the graft polymer of the present invention is entirely different from physical blends. It is to be noted that the inherent viscosities of the graft polymer increase at a rapid rate as compared to those of the blends which are very close in agreement to the calculated viscosities.

The unique relationship of the styrene-acrylonitrile polymer chain and polyvinyl chloride in this graft is dependent upon:

(1) An association which is molecular in relation to size and distribution;
(2) Is not dependent on external working or mixing for improvements in efficiency of contact;
(3) May be a chemical as well as a physical bonding; and
(4) The molecular substrate of the polyvinyl chloride particles promotes dependable efficient polymerization of unusually high molecular configurations of styrene-acrylonitrile polymer chains.

It is to be understood that in accordance with the provisions of the patent laws, various modifications can be made in the methods, procedures, compositions and products of the present invention without departing from the spirit of the same.

What is claimed is:

1. The method which comprises in aqueous media at a temperature of from about 25 to 75° C. suspension polymerizing a monomeric mixture comprising from about 10 to 50 parts by weight of a polymerizable vinyl nitrile monomer and from 90 to 50 parts by weight of a polymerizable vinyl aryl monomer in the presence of finely divided particles of a suspension polymerized vinyl halide polymeric material, said polymeric material having been swollen with from about 5 to 30 parts by weight based on 100 parts by weight of said polymeric material of an essentially water insoluble organic swelling agent for said polymeric material and which is a good solvent for said monomeric mixture, said swelling agent having a high vapor pressure, having a melting point below about 20° C. and being selected from at least one of the group consisting of an alkyl ketone, a halogenated alkane, an aromatic hydrocarbon, vinyl chloride, vinyl fluoride and vinyl bromide, said vinyl chloride, vinyl fluoride and vinyl bromide being used in an amount of from about 5 to 10 parts by weight per 100 parts by weight of said vinyl halide polymeric material, and the other swelling agents being used in an amount of from about 8 to 30 parts by weight per 100 parts by weight of said vinyl halide polymeric material, the ratio of said mixture to said polymeric material being from about 20:100 to 100:100 parts by weight to a conversion of from about 70 to 100% to form a graft of at least a portion of said monomeric mixture onto said polymeric material, and drying the resulting graft polymer composition to remove water and said swelling agent.

2. The method which comprises in aqueous media at a temperature of from about 45 to 55° C. suspension polymerizing a monomeric mixture comprising from about 20 to 35 parts by weight of a polymerizable vinyl nitrile monomer and from 80 to 65 parts by weight of a polymerizable vinyl aryl monomer in the presence of finely divided particles of a suspension polymerized swollen vinyl halide polymeric material, the ratio of said mixture to said polymeric material being from about 25:100 to 50:100 parts by weight, said polymeric material having been swollen with an essentially water insoluble organic swelling agent for said polymeric material and which is a good solvent for said monomeric mixture, said swelling agent having a high vapor pressure, having a melting point below about 20° C. and being selected from at least one of the group consisting of an alkyl ketone, a halogenated alkane, an aromatic hydrocarbon, vinyl chloride, vinyl fluoride and vinyl bromide, said vinyl chloride, vinyl fluoride and vinyl bromide being used in an amount of from about 5 to 10 parts by weight per 100 parts by weight of said vinyl halide polymeric material, and the other swelling agents being used in an amount of from about 8 to 30 parts by weight per 100 parts by weight of said vinyl halide polymeric material, to a conversion of from about 70 to 100% and to graft at least about 20% of said monomeric mixture onto said polymeric material, the swelling agent being added to the vinyl halide polymeric material to effect swelling prior to the polymerization of said first named mixture and being removed after the polymerization by drying the resulting graft polymer composition.

3. The method according to claim 2 in which said vinyl nitrile monomer is acrylonitrile, said vinyl aryl monomer is styrene, and said polymeric material is polyvinyl chloride.

4. The method according to claim 2 in which said swelling agent is an alkyl ketone.

5. The method according to claim 2 in which said swelling agent is a halogenated alkane.

6. The method according to claim 2 in which said swelling agent is an aromatic hydrocarbon.

7. A graft polymer made by the method of claim 24 and which is capable of being elongated uniformly from 400 to 2000% at 340° F. without tearing and comprising a suspension polymerized mixture of from about 20 to 100 parts by weight of vinyl nitrile and vinyl aryl monomers and 100 parts by weight of a suspension polymerized polyvinyl halide material, the ratio of said vinyl nitrile monomer to said vinyl aryl monomer being from about 10:90 to 50:50 parts by weight.

8. A graft polymer according to claim 7 in which the parts by weight ratio of said mixture to said polyvinyl halide material is from about 25:100 to 50:100 and the parts by weight ratio of said vinyl nitrile monomer to said vinyl aryl monomer is from about 20:80 to 35:65.

9. A graft polymer according to claim 8 in which said vinyl nitrile monomer is acrylonitrile, said vinyl aryl monomer is styrene, and said polyvinyl halide material is polyvinyl chloride.

References Cited by the Examiner

UNITED STATES PATENTS

| 2,746,944 | 5/56 | Naps et al. | 260—45.5 |
| 2,824,079 | 2/58 | Fischer | 260—45.95 |
| 2,889,582 | 6/59 | Cooper | 260—45.5 |

FOREIGN PATENTS

| 228,748 | 6/60 | Australia. |

OTHER REFERENCES

Buttrey: "Plasticizers," Cleaver-Hume Press Ltd. (1957), pages 145–46.

ALEXANDER H. BRODMERKEL, *Primary Examiner.*

DANIEL ARNOLD, LEON J. BERCOVITZ, MORRIS LIEBMAN, *Examiners.*